United States Patent
Kwong

[19]

[11] Patent Number: 6,076,150
[45] Date of Patent: Jun. 13, 2000

[54] CACHE CONTROLLER WITH IMPROVED INSTRUCTION AND DATA FORWARDING DURING REFILL OPERATION

[75] Inventor: Mark J. Kwong, Santa Clara, Calif.

[73] Assignee: LSI Logic Corporation, Milpitas, Calif.

[21] Appl. No.: 08/929,613

[22] Filed: Sep. 15, 1997

Related U.S. Application Data

[63] Continuation of application No. 08/513,378, Aug. 10, 1995, abandoned.

[51] Int. Cl.[7] .............................. G06F 12/00; G06F 13/00
[52] U.S. Cl. .......................... 711/168; 711/158; 711/150; 711/3
[58] Field of Search .................................. 711/168, 158, 711/150, 118, 3

[56] References Cited

U.S. PATENT DOCUMENTS

| | | | |
|---|---|---|---|
| 4,317,168 | 2/1982 | Messina et al. | 395/470 |
| 4,755,936 | 7/1988 | Stewart et al. | 395/445 |
| 4,768,148 | 8/1988 | Keeley et al. | 395/468 |
| 4,912,631 | 3/1990 | Lloyd | 395/445 |
| 4,994,962 | 2/1991 | Mageau et al. | 395/403 |
| 5,148,536 | 9/1992 | Witek et al. | 395/467 |
| 5,253,358 | 10/1993 | Thoma, III et al. | 395/500 |
| 5,353,426 | 10/1994 | Patel et al. | 395/445 |
| 5,386,526 | 1/1995 | Mitra et al. | 395/403 |
| 5,434,993 | 7/1995 | Liencres et al. | 395/460 |
| 5,526,508 | 6/1996 | Park et al. | 395/449 |
| 5,526,510 | 6/1996 | Akkary et al. | 711/133 |
| 5,555,392 | 9/1996 | Chaput et al. | 395/445 |
| 5,566,317 | 10/1996 | Treiber et al. | 395/444 |
| 5,577,200 | 11/1996 | Abramson et al. | 395/185.03 |

*Primary Examiner*—Eddie P. Chan
*Assistant Examiner*—Hong Kim
*Attorney, Agent, or Firm*—Conley, Rose & Tayon, PC; B. Noel Kivlin

[57] ABSTRACT

A cache controller with an improved cache memory refill operation is presented. After a request from a CPU for a word of information and the word is not found in the cache memory, the cache controller starts a refill operation by which a line of information including the requested word is loaded into the cache memory from a main memory. The cache controller keeps track of the CPU requests. When a requested word appears during the refill operation, the CPU is notified to load the requested word as the word is loaded into the cache memory. Furthermore, the cache controller efficiently takes advantage of free cycles in the refill operation. If the CPU has requested a word in the cache memory, the cache controller reads the word from the cache memory so the CPU can load the word during a free cycle.

11 Claims, 6 Drawing Sheets

CACHE CONTROLLER WITH IMPROVED INSTRUCTION AND DATA FORWARDING DURING REFILL OPERATION

This application is a continuation of U.S. application Ser. No. 08/513,378, filed Aug. 10, 1995, entitled "Cache Controller with Improved Instruction and Data Forwarding During Refill Operation", now abandoned.

BACKGROUND OF THE INVENTION

The present invention is related to CPUs (Computer Processor Units) having a cache memory and, in particular, to cache memory controllers and their method of operation.

In an effort to speed access to memory information, many computer systems have a cache memory which is closely coupled to the CPU. The cache memory is formed from high-speed memory cells, which allow the CPU unit to have quicker access to the requested information than the slower, but less expensive, main memory. For example, many personal computer systems today have a cache memory of static RAM (Random Access Memory) cells with a main memory of slower dynamic RAM cells.

The main memory is much larger than the cache memory. At any time the cache memory holds only a fraction of the contents of the main memory. Thus the cache memory replaces its contents with information from the main memory to remain current with the requests from the CPU. A cache controller unit in the computer system handles the CPU requests to determine the requested information is in the cache memory, a "hit", or not, a "miss". If there is a hit, the cache memory supplies the information to the CPU. If there is a miss, the cache controller refills the cache memory with the requested information. The information is then transferred from the cache memory to the CPU.

Misses and the resulting cache refill operation slow the operation of the CPU, which must wait for the requested information. To avoid misses and the subsequent refill operation, information which will be used by the CPU should be kept in the cache. Of course, predicting the future is difficult so various techniques are used to keep the limited amount of cache memory filled with information which is likely to be used by the CPU. For example, when a miss occurs and information in the cache memory must be replaced to make room for the requested information, the common Least Recently Used algorithm technique discards the information which was last used by the CPU the farthest back in time, as the name implies. Based upon the fair assumption that a CPU continues to request the same information most of the time, this technique increases the likelihood of a hit.

On the other hand, the present invention assumes a refill operation and provides for improvements to the cache controller and the refill operation so that the operation of the CPU is retarded as little as possible.

SUMMARY OF THE INVENTION

In a computer system having a CPU, a cache memory connected to the CPU, a main memory, and a cache controller connecting the main memory to the CPU and the cache memory, the present invention provides for the cache controller having a circuit which generates a control signal for the CPU when a word of information requested by the CPU, not in the cache memory, is transferred in a line of information to the cache memory from the main memory during a refill operation. From the control signal, the requested word of information is loaded into the CPU as the word is loaded into the cache memory. The CPU is loaded prior to completion of the transfer of the line of information, as is done in the prior art.

Furthermore, the cache controller also has a circuit which utilizes empty clock cycles in the refill operation of a block of information from the main memory to the cache memory. The main memory of a computer system typically requires some time to respond to a memory request. If the CPU requests a word in the cache memory during the refill operation, the circuit transfers the word from the cache memory to the CPU during a free clock cycle. The CPU is not required to wait for the end of the refill operation.

DETAILED DESCRIPTION OF PREFERRED EMBODIMENTS

Figure 1:
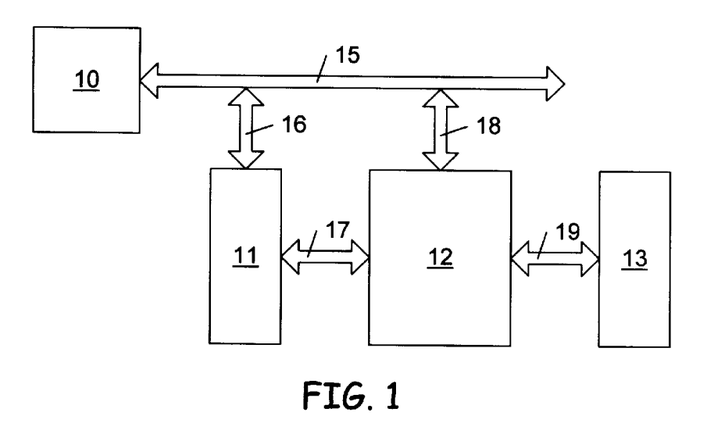
FIG. 1 is a general block diagram of a computer system with a main memory, cache memory and cache controller for the cache memory, according to the present invention.

FIG. 1 illustrates the general organization of a computer system with a cache memory according to the present invention. The system has a CPU 10, a cache memory 11, a cache controller unit 12 and a main memory 13. Other parts of the computer system which are not pertinent to the present invention are not shown. The CPU 10 communicates over a first bus 15 to the cache memory 11 and the cache controller unit 12. In the particular computer system described, the bus 15 has a first set of 32 signal lines which can carry data or instruction signals and a second set of 32 signal lines which carry addresses for data or instructions. Other signal lines in the bus 15 are control signal lines. A set of signal lines 16 connects the cache memory 11 to some of the lines of the bus 15. The signal lines 16 includes the set of data/instruction lines and the set of address lines.

The cache controller unit 12 communicates with the main memory 13 over a second bus 19 and with the CPU 10 over the first bus 15 through a set of signal lines 18, which also includes the set of data/instruction lines and the set of address lines. The cache controller unit 12 is also connected to the cache memory 11 by a set of signal lines 17.

In a standard operation the cache controller unit 12 receives a request from the CPU 10 for information at a specific memory location over the bus 15 (and signal lines 18). At the same time the CPU 10 also sends the address of a 32-bit word to the cache memory 11. The cache memory 11 responds whether the address from the CPU 10 matches the tag bits of the information stored in the cache memory 11. If there is a match, the cache memory 11 informs the cache controller unit 12 over the lines 17 of a cache hit. In response, the unit 12 instructs the memory 11 over the lines 17 to send the requested information to the CPU 10 over the lines 16 and bus 15.

If there is no match, the cache memory 11 informs the cache controller unit 12 over the lines 17 of a cache miss. The controller unit 12 then sends the address of the word over the bus 19 to the main memory 13 and begins an operation to refill a line of information in the cache memory 11. In the present case a line of information is four words. (Thus the tag bits in the cache memory 11 match the common address bits of the four words in a line, i.e., all but the least two significant address bits). The main memory 13 begins the transmission of the first word in the line over the bus 19 and the bus controller unit 12 informs the cache memory 11 through the control signals 17 that a refill operation has started. Each word of the line is received by the cache controller unit 12 and sent over the bus 15 for storage in the cache memory 11 over the lines 16.

Cache memories and cache controller units have been in computer systems for many years and the details of designing cache controller units are well-known to computer system designers. Thus the following description is concentrated on the improvements of a cache controller unit and its operation according to the present invention.

Figure 2:
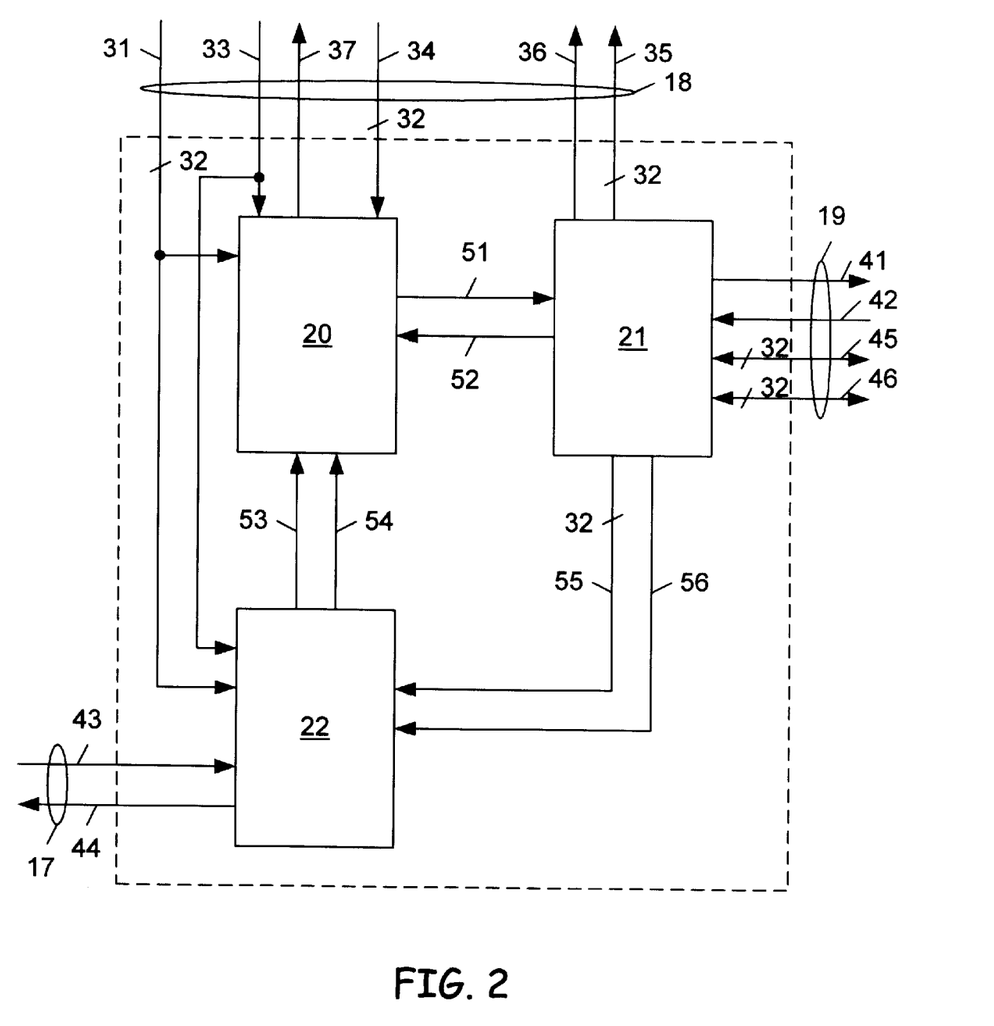
FIG. 2 is a block diagram of the cache memory controller of FIG. 1.

FIG. 2 illustrates the organization of the cache controller unit 12 according to the present invention. The cache controller unit 12, as well as the CPU 10, the cache memory 11, the bus 15 and signal lines 16, 17 and 18, is manufactured in a single integrated circuit. The cache controller unit 12, enclosed by a dotted line, has a queue controller block 20, a bus interface controller block 21 and a cache controller block 22. The cache controller block 22 interfaces with the cache memory 11 to handle operations in the memory 11. The bus interface controller block 21 interfaces with the main bus 19 to handle operations with the main memory 13. The queue controller block 20 interfaces with the bus 15 to "talk" with the CPU 10 and communicates with the other blocks 21 and 22 within the controller unit 12 over internal signal lines described below.

Figure 6:
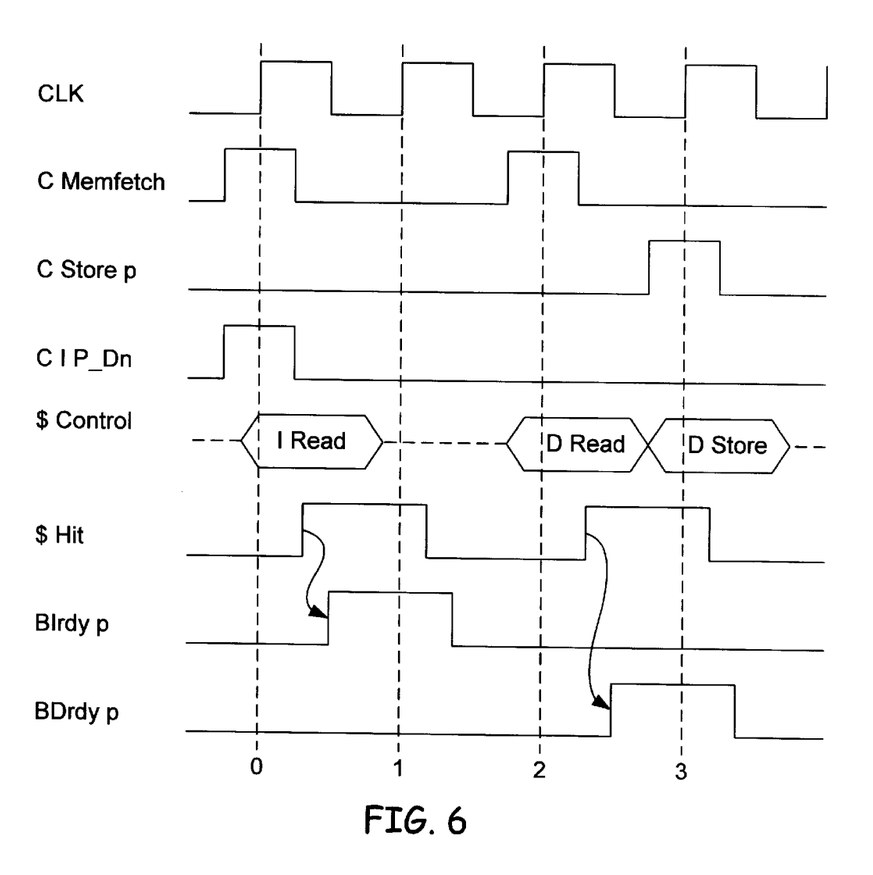
FIG. 6 is a timing diagram of the signals of the cache controller unit when a hit occurs in response to a CPU request.
Figure 7:
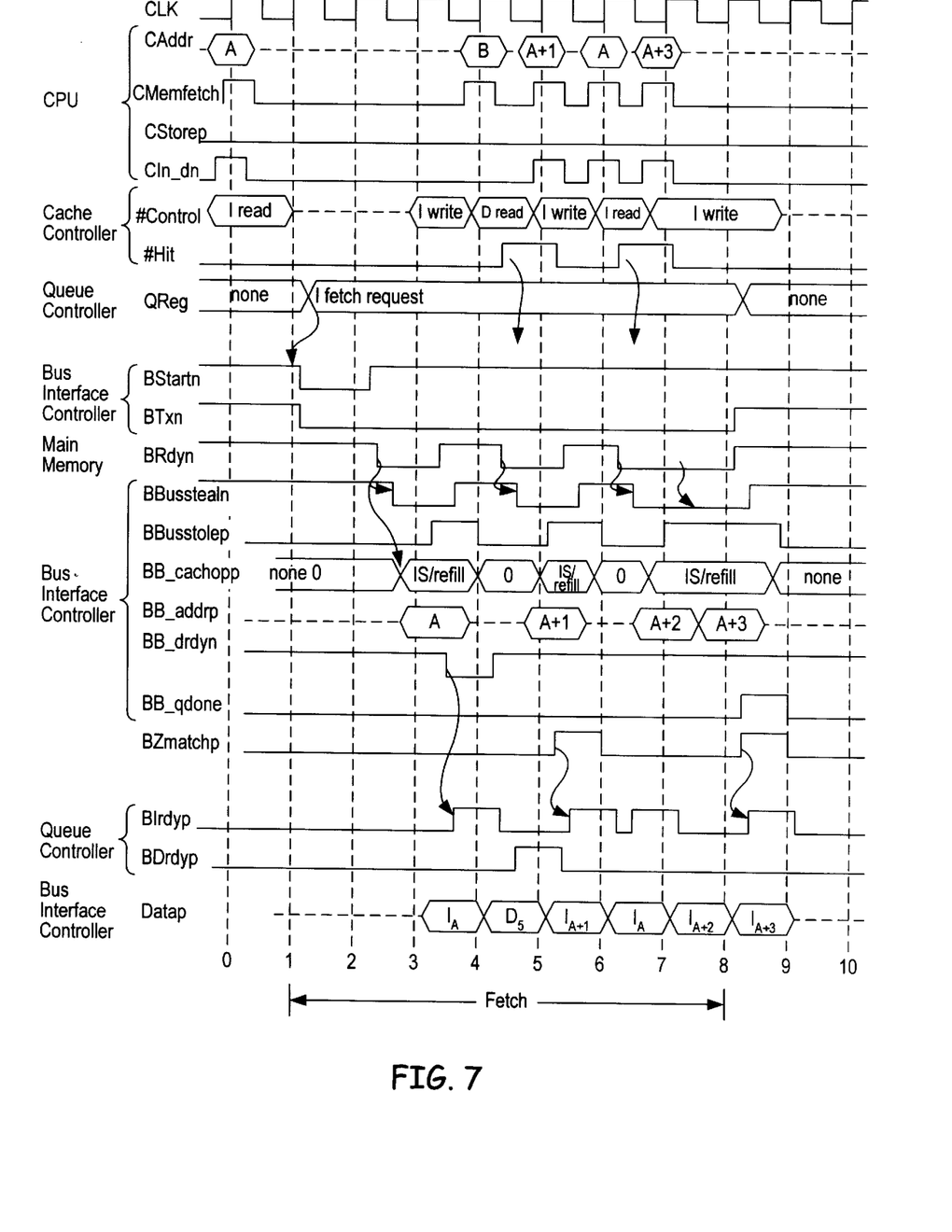
FIG. 7 is a timing diagram of the signals of the cache controller unit when a miss occurs in response to a CPU request.

The signal lines 17 between the cache controller block 22 and the cache memory 11 are formed by Tag Match and Valid lines 43 and Cache Control lines 44. The signals on the Cache Control lines 44, termed "$Control" in the timing diagrams in FIGS. 6 and 7, are generated by the cache controller block 22 to direct operations within the cache memory 11, such as whether a read or write operation is to be performed. Over the Tag Match and Valid signal lines 43 the cache memory 11 informs the cache controller block 22 of a cache hit (Tag Match) and whether each word location in the cache memory 11 has been loaded from the main memory 13 (Valid). The Valid signals are especially important at the beginning of computer operations before the cache memory 11 is filled with information from the main memory 13.

The set of lines 18 between the cache controller unit 12 and the bus 15 includes thirty-two address lines 31, the signals of which are termed "CAddr" in the timing diagrams of FIGS. 6 and 7, and thirty-two data/instruction lines 34 from the main bus 15 to the queue controller 20. The lines 18 also include thirty-two data/instruction lines 35, carrying signals "Datap" in the timing diagrams noted below, from the bus interface controller block 21 to the bus 15. It should be noted that lines 34 and 35, though shown separately, represent one set of thirty-two lines to carry data/instruction signals to and from the bus 15. The separate lines 34 and 35 are used to illustrate the origin of the data/instructions signals in the cache controller unit 12 to the bus 15 and the destination of the data/instructions signals from the bus 15 to the cache controller unit 12. Also included in the set of lines 18 are: a CPU Request line 33 representing control signal lines carrying signals from the CPU 10 to request instructions and data, a CPU Bus Steal line 36 from the bus interface controller block 21 carrying a BBus_stealn signal to reserve the data/instruction and the address lines of the bus 15 for transmission by the cache controller unit 12; and a CPU Data Ready line 37 which represents control signal lines listed below from the queue controller block 20 to the CPU 10. carrying BIrdyp, "instruction ready," and BDrdyp, "data ready," to indicate the status of information, data or instruction, which had been requested by the CPU.

The following is a more detailed listing of the control signals (and control lines carrying these signals) for the set of lines 18:

CPU address line 31:
  Caddr—Address of information requested or to be stored
CPU request line 33:
  Cip_dn—Designates whether information requested by CPU is instruction (positive) or data (negative).
  Cmemfetchp—Request to fetch information from main memory.
  Cstorep—Request to store information to main memory.
CPU ready line 37:
  Birdyp—Signal to CPU that instruction requested is on bus 15.
  Bdrdyp—Signal to CPU that data requested is on bus 15.
Data/instruction lines 34/35:
  Datap—Data or instructions transferred between the CPU and the cache controller unit 12.
CPU bus steal line 36:
  Bbus_stealn—Active negative signal to CPU to get off the bus 15; do not drive the bus 15.

The bus 19 between the cache controller unit 12 and the main memory 13 has lines 41, 42, 45 and 46 which are connected to the bus interface controller block 21 and the main bus 19. Memory Request line 41 represents control signal lines which request information from the main memory 19; Memory Ready line 42 represents a control signal line from the main memory 13 which indicates that the main memory is ready to transmit the requested information; line 45 represents thirty-two lines over which information, data or instruction, is sent between the main memory 13 and the cache controller 12; and line 46 represents thirty-two address lines for the information on the line 45. A more detailed listing of the control signals (and control lines carrying these signals) for the set of lines 19 is as follows:

Memory Request line 41:
  Bstartn—Negative pulse for one clock cycle indicates the beginning of refill operation.
  Btxn—Active negative signal for duration of refill operation.
Memory Ready line 42:
  Brdyn—Active negative signal from main memory to indicate that one of the requested words of refill operation is available from main memory.
Information line 45:
  No specific name—32 bits of information, either data or instruction, for transfer to or from main memory.
Address line 46:

No specific name—32 bits of address of the information transferred on information line 45.

Internal to the cache controller unit 12, a Queue Request line 51 represents a set of signal lines from the queue controller block 20 by which requests for a refill operation are made to the bus interface controller block 21. The Queue Request line 51 contains information lines by which data and instructions are sent from the queue controller block 20 to the bus interface controller block 21, and address lines for the addresses of the data and instructions. A Request Done line 52 represents a set of signal lines from the bus interface controller block 21 by which the status of responses to the requests from the queue controller block 20 are made. A more detailed list of control signals (and control lines carrying these signals) for the set of lines between the queue controller block 20 and the bus interface controller block 21 is as follows:

Queue Request line 51:
   BB_ipdn—Designates whether information to be refilled from main memory is instruction (positive) or data (negative).
   BB_wrn—Request to read or store information into main memory.
   BB_reqn—Request to start a main memory read or store transaction.
   BB_qdatap—32 bits of information to be stored into main memory.
   BB_qadddrp—32 bits of address of information to be stored or refilled.
Request Done line 52:
   BB_drdyn—Negative pulse to indicate the retrieval of the first word in the refill operation.
   BB_qdonep—Positive pulse to indicate completion of refill operation.

The queue controller block 20 is also connected to the cache controller block 22 by a $Hit line 53 which carries a $Hit signal to indicate that the information requested by the CPU is in the cache memory 11, and a BZ_matchp line 54 which carries a control signal indicating whether a word of information requested by the CPU matches a word being refilled into the cache memory 11. The control signals on the two control lines from the cache controller block 22 to the queue controller block 20 are as follows:

$Hit line 53—Positive to indicate that a word of information requested by the CPU is in the cache memory.
BZ_matchp line 54—Positive to indicate that a word of information requested by the CPU is the word being transferred during a refill operation.

The bus interface controller block 21 and cache controller block 22 are connected by Refill Request lines 56 from the bus interface controller block 21, which lines carry signals to indicate to the cache controller block 22 the particular refill operation to be performed in the cache memory 11 and other control signals whose purpose is described below, and thirty-two address lines 55 for the address of the word being refilled into the cache memory 11. A more detailed list of signals (and lines carrying these signals) for the set of lines between the bus interface controller block 21 and the cache controller block 22 is as follows:

Refill Request lines 56:
   BB_cacheopp—Multiple control bits, three in the present example, to indicate the particular operation to be conducted by the cache memory.
   BBus_stolep—An inverted and delayed signal of BBus_stealn.
address lines 55:
   BB_addr—32 bits of address of the word of information being transferred, refilled, from main memory to cache memory.

Figure 3A:
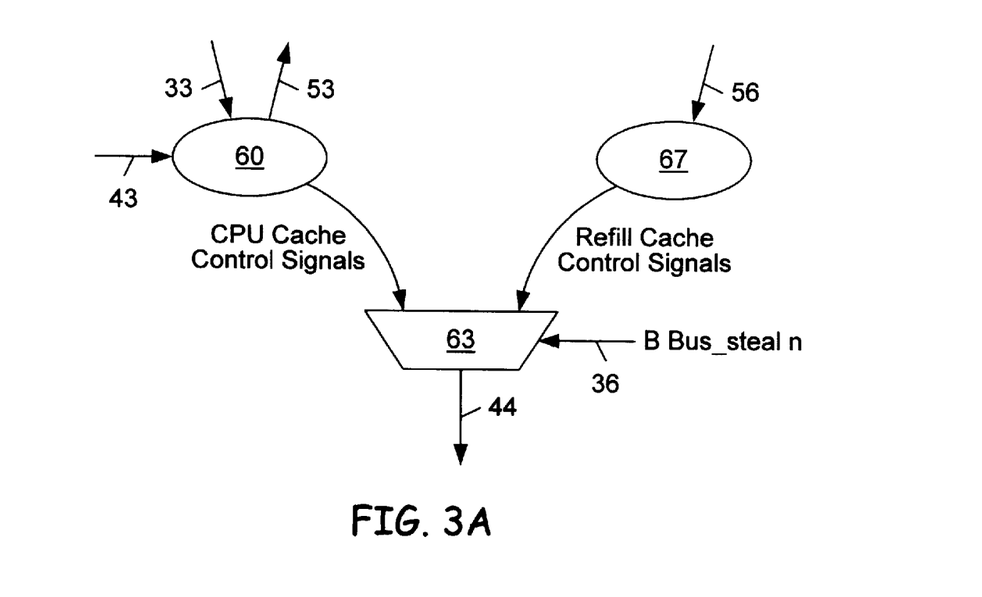
FIG. 3A is a block diagram of a portion of the cache controller block of the cache memory controller of FIG. 2.

FIG. 3A illustrates a part of the cache controller block 22 and its generation of control signals for the cache control lines 44 to the cache memory 11. As shown in FIG. 3A, the cache controller block 22 has two state machines, a CPU state machine 60 and a refill operation state machine 61. Responsive to the control signals on the CPU request lines 33 and the signals on the Tag Match and Valid lines 43 from the cache memory 11, the CPU state machine 60 generates a signal for the $Hit line 53 indicative of whether the information requested by the CPU is in the cache memory 11 or not. Responsive to the signals on the CPU Request lines 33 and the Tag Match and Valid lines 43, the CPU state machine 60 also generates a set of CPU Cache control signals to handle operations within the cache memory 11.

The refill cache operation state machine 61 is responsive to control signals on the Refill Request lines 56 from the bus controller interface block 21 and generates Refill Cache control signals to direct the refill operation in the cache memory 11. The control signals for the CPU Cache and Refill Cache operations are sent to a multiplexer 63 which selects which set of control signals to send to the cache memory 11 on the cache control lines 44. The multiplexer 63 is responsive to the BBus_stealn signal, which is generated by the bus controller block 21. As stated above, the BBus_stealn is active negative to indicate that a refill operation is to occur and that the bus 15 is to be cleared for a word being transferred from the main memory 13 to the cache memory 11. At the same time, the multiplexer 63 selects the Refill Cache control signals. If the BBus_stealn signal is not active, the multiplexer selects the CPU Cache control signals.

Figure 3B:
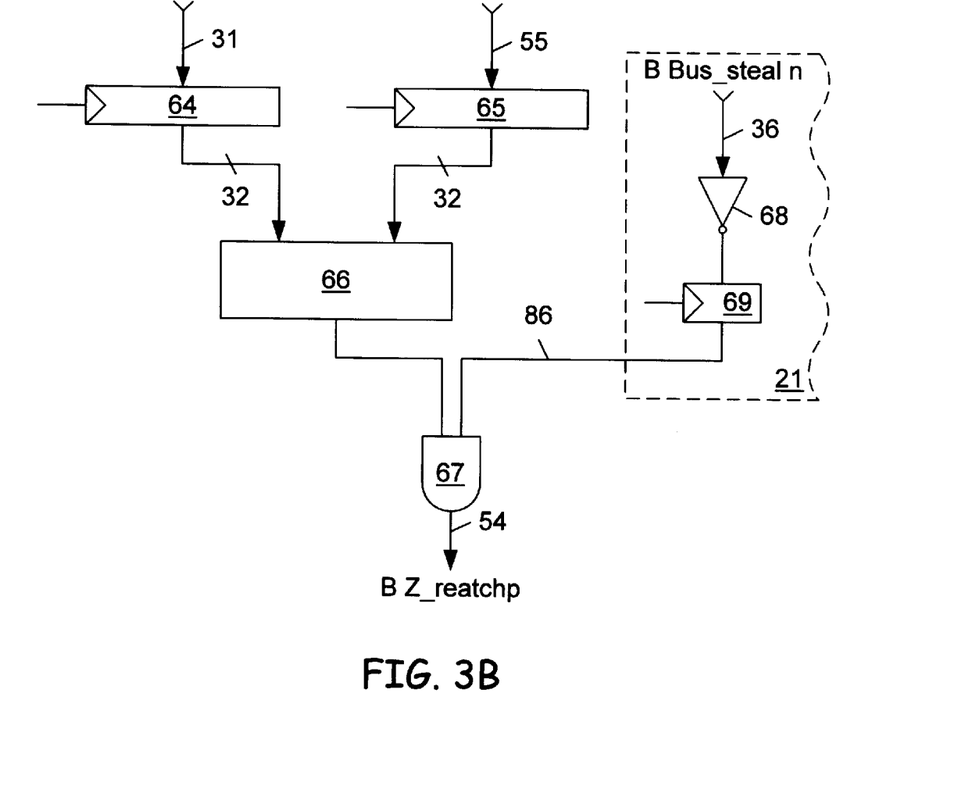
FIG. 3B illustrates another portion of the cache controller block.

FIG. 3B illustrates another part of the cache controller block 22, which generates the control signal for the BZ_matchp line 54 to the queue controller block 20. A register 64 receives the address bits of the word of information, instruction or data, requested by the CPU 10 over the signal lines 31. Over the address lines 55, a second register 65 receives the address bits of the word being refilled from the main memory 11 from the bus interface control block 21 during a refill operation. The addresses in the registers 64 and 65 are compared by a comparison logic block 66, which generates a logic 1 if the two addresses match and a logic 0 if they don't. The output terminal of the comparison logic block 66 is connected to one input terminal of an AND logic gate 67.

A second input terminal to the AND gate 67 is connected to a line 86, one of the control lines 56 from the bus interface controller block 21. The line 86 carries the BBus_stolep signal listed previously. A flip-flop 69 and an inverter 68, which are elements of the bus interface controller block 21, indicated by the dotted line around the elements 68 and 69, generate the BBus_stolep signal from the BBus_stealn control signal on the line 36 from the bus interface controller block 21.

Clock signals to the registers 64 and 65, and the flip-flop 69 control the timing of the operations. Operationally, the BZ_matchp signal can be activated, logic 1, when the addresses in the two registers 64 and 65 match, and the BBus_stealn control signal is activated. Otherwise, the control signal on the BZ_matchp control line 54 is logic 0. Stated differently, the BZ_matchp control signal is activated when the cache controller unit 12 is engaged in a cache refill operation and the address of the data/instruction requested by the CPU 10 matches the address of the data/instruction being transferred to the cache memory 11.

Figure 4:
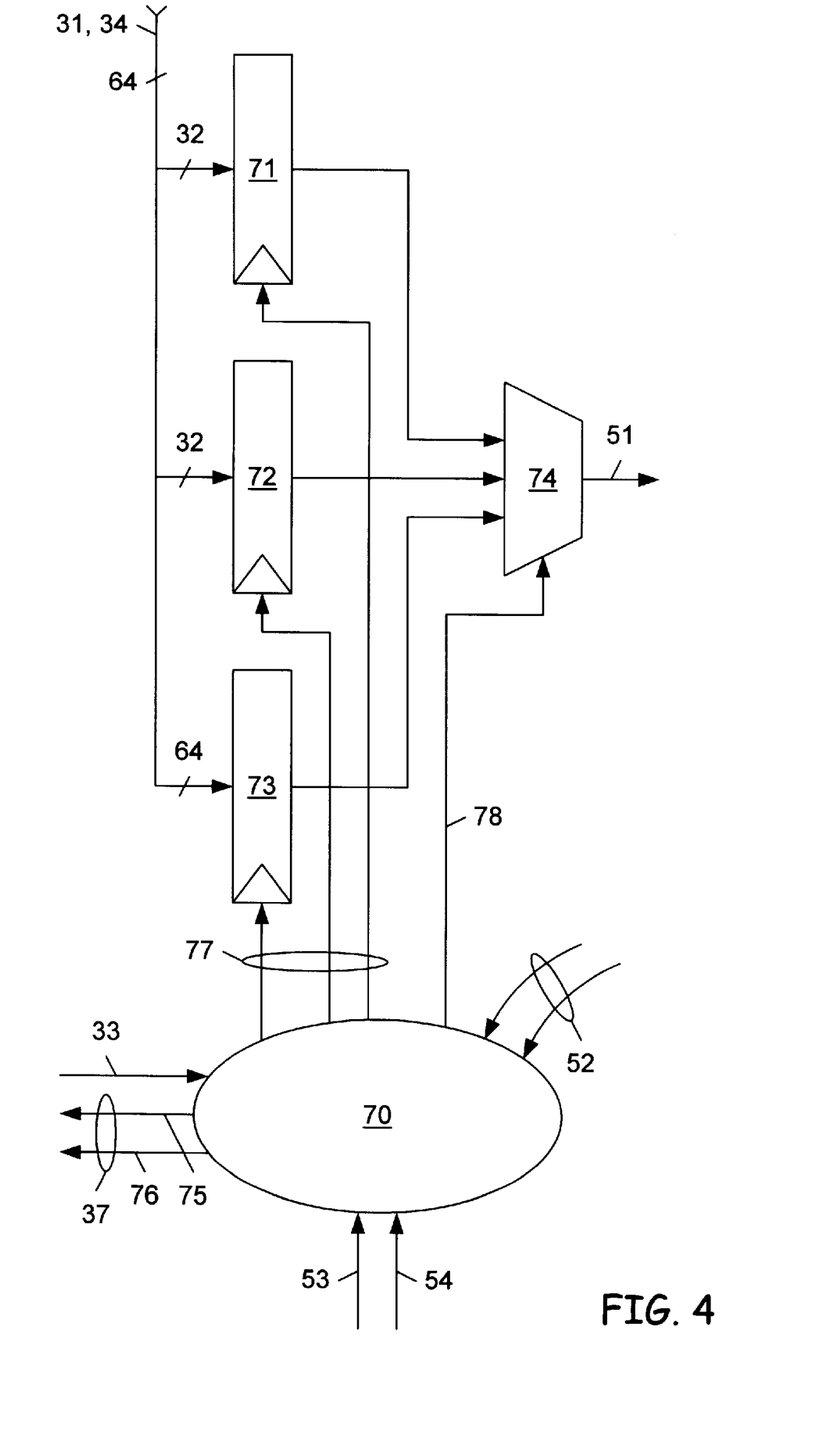
FIG. 4 is a block diagram of a portion of the queue controller block of the cache memory controller of FIG. 2.

FIG. 4 illustrates the parts of the queue controller block 20 and their operation according to the present invention. The block 20 has three registers 71–73, which are connected to the data/instruction lines 31 and address lines 34 from the CPU 10. The registers 71 and 72 are connected to the address lines 34 and the register 73 is connected to both the data/instruction lines 31 and address lines 34. The register 71 holds the address of an instruction and the register 72 holds the address of data, requested by the CPU 10. The register 73 holds the address and data from the CPU which is to be stored in the main memory 13. The output terminals of these registers 71–73 are connected to the input terminals of a multiplexer 74 which has its output terminals connected to the Queue Request lines 51 (for the BB_qdatap and BB_qaddrp signals) to the bus interface controller block 21.

The operation of the registers 71–73 and multiplexer 74 is controlled by a queue controller state machine 70. The state machine 70 receives signals on the CPU Request lines 33, which include CIp_Dn, CMemfetchp, and CStorep. As noted previously, the signal on the CIp_Dn line indicates whether the information requested is an instruction (positive) or data (negative). The CMemfetchp signal indicates that a CPU request for information from memory and the CStorep signal indicates a CPU request to store information into memory.

The state machine 70 also receives signals on the $Hit line 53 and BZ_match line 54 from the cache controller block 22, and the control signals on the Refill Request lines 52 from the bus interface controller block 21. Three control signal lines 77 to each of the register 71–73 and a control line 78 to the multiplexer 74 select the contents of one of the registers 71–73 to be placed upon the Queue Request lines 51 to the bus interface controller block 21.

The queue controller state machine 70 also generates control signals BIrdyp and BDrdyp which are placed on signal lines 75 and 76, part of the CPU ready lines 37. The BIrdyp and BDrdyp signals are generated according to some shorthand logic equations as follows:

BIrdyp=[(CPpurequest==IFetch) & ($Hit||BZ_match)]||
    [(QUeuereqest==IFetch) & REqready]

BDrdyp=[(CPurequest==DFetch) & ($Hit||BZ_match)]||
    [(QUeuereqest==DFetch) & REqready]

where "||" represents a logical OR "&" represents a logical AND "==" represents a logical function as follows: if the values on both sides or the symbol are equal, then output is 1; otherwise output is 0.

The equations are "shorthand" in the sense that some of the equation variables, such as CPpurequest and IFetch, represent a set of signals. Stated in words, the BIrdyp signals is activated when 1) the CPU 10 requests an instruction word and there is a hit or a match of an instruction word during a refill operation; or 2) during a refill operation for an instruction word, the first requested word is fetched from the main memory 13. The BDrdyp signal is likewise activated for a data word.

Figure 5:
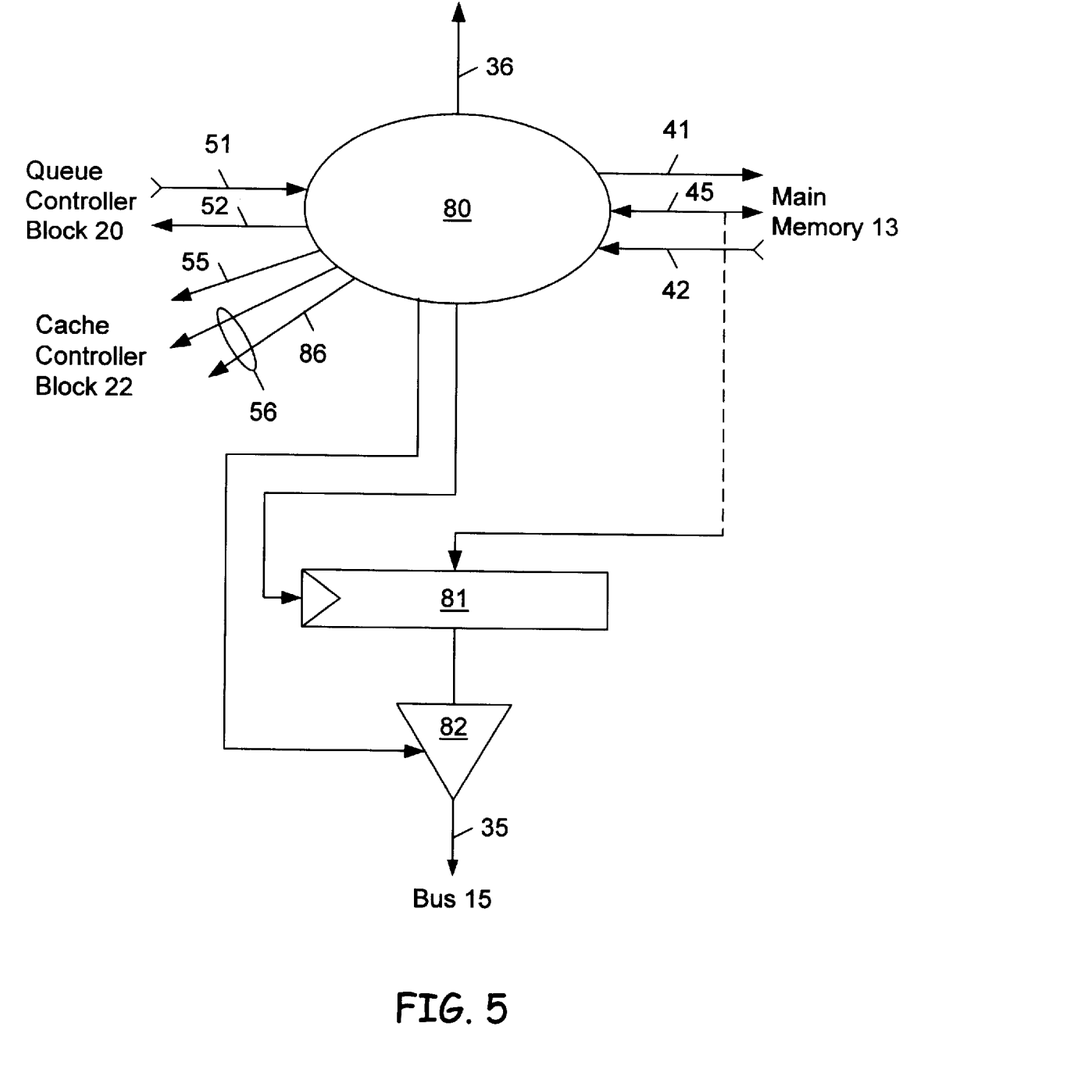
FIG. 5 is a block diagram of a portion of the bus interface controller block of the cache memory controller of FIG. 2.

FIG. 5 illustrates parts of the bus interface controller block 21 and their operation, according to the present invention. The bus interface controller block 21 has a state machine 80 which receives signals on the Queue Request lines 51 and the BRdyn signals on the Memory Ready line 42 from the main memory 13 over the bus 19. The state machine 80 generates signals for the refill Request Done lines 52, signals for the Refill Request lines 56 to the cache controller block 22, including the BBus_stealn and BBus_stolep signals, and signals for the Memory Request lines 41 and the signals for the address lines 46.

For a refill operation, the bus interface controller block 21 receives the address of the requested word over the Queue Request lines 51 from the queue controller block 20. The bus interface controller block 21 then generates the addresses of the next three words of the line to be refilled into the cache memory 11 from the first address. The state machine 80 ensures that the address of each word is sent over the Refill Address lines 55 to the cache controller block 22 as that word is received from the main memory 13.

For the first word retrieved in a refill operation, i.e., the word requested which starts the refill operation, the state machine 80 activates a signal (BB_drdyn signal listed above) over the Request Done lines 52 to the queue controller block 20. This allows the activation of the BIrdyp and BDrdyp signals from the queue controller state machine 70 so that the CPU 10 is notified to receive the word it had requested while allowing the CPU to continue operations rather allowing the CPU to stall because of the lack of the requested word.

The state machine 80 also generates control signals for a register 81, which receives the data/instruction words on the information lines 45, and a buffer 82 which, when enabled, sends the information bits from the register 81 on the data/instruction lines 35 to the bus 15 shown in FIG. 1.

In particular, it should be noted that the BBus_stealn (and BBus_stolep) signal is generated when the BRdyn is active. That is, when the main memory 13 has provided a requested word, the BBus_stealn signal is asserted so that the word from the main memory 13 can be placed onto the bus 15.

FIG. 6 illustrates the timing of various signals of the cache controller unit 12 in an exemplary operation. Cache hits are illustrated. The CPU 10 first requests an instruction word. The three signals on the CPU Request lines 31, CMemfetch, CStorep, and CIp_dn at the first positive transition of the Clk signal, indicate the nature of the requested information. Since CMemfetch is high (CStorep is low) and CIp_dn is high also, an instruction is requested by the CPU 10. $Control signals on the lines 44 from the cache control block 22 to the cache memory 12 indicate a instruction read operation. The signals on the Tag Match and Valid lines 43 indicate that the requested instruction word is in the cache memory 12 and the CPU state machine 60 of the cache control block 22 generates a $Hit signal on the signal line 53. The queue controller block 20 generates a signal on a BIrdyp to indicate that the instruction is ready to the CPU 10.

At the third positive clock transition, the CPU 10 requests a word of data. While the CMemfetch signal is high, the CIp_dn signal is low. The cache controller block 22 generates the $Control signals over the lines 44 to indicate to the cache memory 11 that a data read operation is to be performed. The cache memory 11 responds over the Tag Match and Valid lines 43 that the requested data word is available and the cache controller block 22 generates a $Hit signal to the queue controller block 20. The block 20 then indicates that the data word is ready for the CPU 10 by a positive BDrdyp signal.

At the fourth positive transition of the Clk clock signal, the CPU 10 requests a data store operation by making the CStorep signal high (and CIp_dn remaining low). Responsive to the CPU Request signals, the signals on $Control lines 44 from the cache controller block 22 are set to indicate a data store operation to the cache memory 12.

FIG. 7 illustrates the improved cache refill operation according to the present invention. In the example of FIG. 7, the CPU initially requests an instruction at address A on the zeroth positive transition of the Clk clock signal. On the fourth positive transition of the clock signal, CPU ask for data at address B. At the fifth positive transition of the clock signal, the CPU requests an instruction at address A+1, on the sixth transition the instruction at address A again and on the seventh transition an instruction at address A+3.

At the zeroth positive clock transition, the cache controller block 22 generates $Control signals for an instruction to be read, but there is no $Hit signal. The requested instruction word at address A is not in the cache memory 11. In response, the queue controller block 20 in the second clock cycle begins an instruction fetch request on the Queue Request lines 51 to the bus interface controller block 21. The bus interface controller block 21 then starts a memory refill operation from the main memory 13 over the Memory Request lines 41. The B_Startn signal goes low for the first requested word and the BTxn signal also goes low at the same time and remains low until all four words of the line to be refilled are fetched from the memory. Not shown are the address signals on the lines 46 from the bus interface controller block 21 to the main memory 13.

Memory, especially main memory, typically require some time to respond (hence the reason for fast cache memories). In the example of FIG. 7, the main memory 13 has a free first clock cycle and responds in the second clock cycle to indicate that the first refill word is being sent to the bus interface controller block 21 over the lines 45. The main memory 13 drives the BRdyn signal low on the line 42. In response, the bus interface controller block 21 drives the BBus_stealn signal low to take over the data/instruction signal lines of the bus 15 to pass the requested instruction word to the cache memory 11.

The bus interface controller block 21 also generates BB_cacheopp signals on the Refill Request lines 56 to the cache controller block 22 to instruct the cache memory 11 that an instruction word is being refilled. Simultaneously the BB_addrp signals on the Refill Address line 55 carry the address A to the cache controller block 22. The BB_drdyn signal is also driven low to indicate the retrieval of the first word of the refill operation to the queue controller block 20. In response, the queue controller block 20 drives the BIrdyp line positive to signal the CPU to load the requested word as the bus interface controller block 21 places the instruction word $I_A$ on the data/instruction lines 35 to the bus 15. This occurs in the third clock cycle.

On the positive transition of the fourth clock cycle, the CPU requests data at address B. The main memory 13 has not yet responded with the second word of the refill operation; BRdyn is inactive (positive) at this point; the clock cycle is free, i.e., not used. The BBus_stealn signal is thus inactive and the cache controller block 22 operates under the CPU state machine 60, as illustrated in FIG. 3A, in response to signals from the bus interface controller block 21. Accordingly, the BB_cacheopp signals on the Refill Request lines 56 from cache controller block 22 informs the cache memory 11 that a data read operation is to be performed. The data word requested is in the cache memory 11 and a $Hit signal is generated by the cache controller block 22 to the queue controller block 20. The queue controller block 20 activates the BDrdyp signal and the cache memory 11 places the requested data word $D_B$ on the bus 15. To indicate that the cache memory 11 is the source of the requested word, the $D_B$ signals in FIG. 7 are indicated by dotted lines since the signals are not truly Datap signals. The signals do not originate from the bus interface controller 21 on the lines 35.

At the fifth positive transition of the Clk signal, the CPU 10 requests an instruction word (as indicated by the CMemfetch, CStorep and CIp_dn signals) at the A+1 address. At the same time, the main memory 13 is ready with the second word of the refill operation. The BRdyn signal is active, i.e., low, and the bus interface controller block 21 generates an active BBus_stealn signal in response. Thus the cache controller block 22 operates under the refill cache operation state machine 61, as illustrated in FIG. 3A. The BB_cacheopp signals on the Refill Request lines 56 from the bus interface controller 21 informs the cache control block 22 that a instruction refill operation is to be performed and the BB_addr signals on the lines 55 simultaneously carry the A+1 address of the second instruction word to the cache controller block 22.

The instruction word requested by the CPU 10 matches the instruction word being refilled. As shown in and described with respect to FIG. 3B, the BZ_matchp signal goes active. The BIrdyp signal from the queue controller block 20 correspondingly becomes active as the instruction word $I_{A+1}$ is placed on the bus 15. Responsive to the BIrdyp signal, the CPU 10 receives the instruction word $I_{A+1}$ as the word is also stored in the cache memory 11.

At the next positive transition of the Clk clock signal, the CPU 10 requests for the instruction word $I_A$ again. The word is now in the cache memory 11. In the example of FIG. 7, the main memory at this point is also not ready to transfer the next instruction word $I_{A+2}$ of the refill operation' BRdyn is positive. The cycle is free. This allows the cache controller block 22 to be controlled by the CPU request state machine 60. With the $Hit signal activated, the BIrdyp signal is also activated and the CPU 10 receives requested word $I_A$ from the cache memory 11 under the control of the $Control signals for an instruction read operation in the sixth clock cycle. It should be noted that if the main memory 13 were ready with the next instruction word $I_{A+2}$, the CPU request for the word $I_A$ would not be serviced. Instead, the refill operation would continue.

Resumption of the refill operation occurs in the next clock cycle. Despite the request for the instruction word at A+3 at the positive transition of seventh clock cycle, the main memory is ready with the instruction word $I_{A+2}$. BRdyn is active at this point. The bus interface controller block 21 drives the BBus_stealn signal active and instructs the cache controller block 22 of an instruction refill operation by the BB_cachopp signals. Simultaneously the third word $I_{A+2}$ of the refill operation is sent to the bus 15 and cache memory 11 by the bus controller block 15.

In the eighth clock cycle the main memory 13 is also ready to delivery the last word of the refill line, the instruction word $I_{A+3}$. BRdyn is low at the positive transition of the Clk signal. The bus interface controller block 21 continues to drive the BBus_stealn signal active and instructs the cache controller block 22 of an instruction refill operation by the BB_cacheopp signals. The address of the last word of the refill operation, A+3, is sent to the cache controller block 22, as the BTxn goes positive to signal the end of the refill operation. In the cache controller block 22 the addresses match in the two registers 64 and 65 and the BZ_matchp signal is activated. Correspondingly the queue controller block 20 activates the BIrdyp again as the fourth word $I_{A+3}$ of the refill operation is sent to the bus 15 and cache memory 11 by the bus controller block 15. In response to the active BIrdyp signal, the CPU 10 receives the instruction word $I_{A+3}$ one clock cycle after the word was requested.

While the above is a complete description of the preferred embodiments of the present invention, various alternatives, modifications and equivalents may be used. For example, the described embodiment has an information bus which carries both instructions and data, and an address bus which carries addresses of both instructions and data. The cache memory also handles both instructions and data. It should be evident that the present invention is equally applicable by making appropriate modifications to the embodiment described above. Therefore, the above description should not be taken as limiting the scope of invention which is defined by the metes and bounds of the appended claims.

What is claimed is:

1. A computer system comprising:
   a CPU;
   a cache memory connected to said CPU;
   a main memory; and
   a cache controller unit coupled to said CPU, the cache controller unit coupled to said main memory by a first data bus and to said cache memory with a second data bus, said cache controller unit having circuit means for generating first control signals for transferring a line of information from said main memory to the cache controller through the first data bus and from the cache controller to said cache memory through the second data bus when a first word of information is requested by said CPU, said cache controller unit also having circuit means generating second control signals for said CPU is found anywhere within said cache memory, whereby said second word of information is received by said CPU prior to completion of said transfer of said line of information;
   wherein said second control signals generating circuit means comprises a matching circuit for comparing an address of said word of information requested by said CPU and an address of a word of information in said line of information being transferred to said cache memory from said main memory, said matching circuit generating said second control signal when said addresses match; and
   wherein said matching circuit comprises a first register for holding an address of said second word of information requested by said CPU, a second register for holding an address of a word of information in said line of information being transferred to said cache memory from said main memory, and a comparison circuit connected to said first and second registers for generating said control signal when said addresses match.

2. The computer system of claim 1 wherein said second control signals generating circuit means further generates said second control signals for said CPU when a word of information requested by said CPU is in said cache memory or is being transferred in a line of information to said cache memory from said main memory.

3. A computer system comprising:
   a CPU;
   a cache memory connected to said CPU;
   a main memory; and
   a cache controller unit coupled to said CPU, the cache controller unit coupled to said main memory by a first data bus and to said cache memory with a second data bus, said cache controller unit having circuit means for generating first control signals for transferring a line of information from said main memory to the cache controller through the first data bus and from the cache controller to said cache memory through the second data bus when a first word of information is requested by said CPU, said cache controller unit also having circuit means generating second control signals for said CPU is found anywhere within said cache memory, whereby said second word of information is received by said CPU prior to completion of said transfer of said line of information;
   wherein said cache controller further comprises:
      a first circuit block connected to said CPU, said first circuit block receiving signals from said CPU indicative of a word requested by said CPU and generating signals to said CPU indicative of the availability of a requested word to said CPU;
      a second circuit block connected to said cache memory by the second data bus and to said first circuit block, said second circuit block receiving signals from said cache memory indicative of whether a word requested by said CPU is in said cache memory and generating signals to control operations in said cache memory, said second circuit block generating signals to said first circuit block indicative of whether a word requested by said CPU is in said cache memory;
      a third circuit block connected to said first circuit block and to said main memory by the first data bus, said third circuit block receiving signals from said first circuit block for retrieving a word of information not in said cache memory, said third circuit block generating signals to said main memory to retrieve said word on the first data bus from said main memory and generating signals to said second circuit block to load said word into said cache memory on the second data bus and receiving signals from said main memory indicative of a retrieval of said word from said main memory; and
      a matching circuit comparing an address of said word of information requested by said CPU and an address of a word of information being retrieved from said main memory to load into said cache memory, said matching circuit generating a signal to said first circuit block when said addresses match, said first circuit block generating a signal indicative of the availability of said requested word in said cache memory or in said retrieval of said requested word from said main memory for loading into said CPU.

4. The cache controller of claim 3 wherein said third circuit block generates signals to said main memory to retrieve a plurality of words from said main memory on the first data bus, including a retrieval of said requested word first, to load into said cache memory on the second data bus, said third circuit block generates signals to said first circuit block indicative of a retrieval of a first word of said plurality of words from said main memory; and wherein said first circuit block generates a signal indicative of said retrieval of said first word from said main memory for loading into said CPU whereby said CPU avoids stalling operations until the retrieval of said requested word.

5. A computer system comprising:
   a CPU;
   a cache memory connected to said CPU;
   a main memory; and
   a cache controller connecting said main memory to said CPU and said cache memory, said cache controller having;
      a first data bus for retrieving words of information to the cache controller from the main memory;
      a second data bus for transferring words of information form the cache controller to the cache memory;
      a first circuit means for sequentially refilling a plurality of words of information from said main memory on the first data bus and to said cache memory on the second data bus; and a second circuit means responsive to a free cycle in said refilling of said plurality of words for loading a word found anywhere within said cache memory and requested by said CPU from said cache memory to said CPU during said free cycle;

wherein said first circuit means generates sequential address signals to said main memory for said plurality of words and receives signals from said main memory at a retrieval of each of said plurality of words; and wherein said second circuit means is responsive to a free cycle in said signals from said main memory to load said requested word to said CPU from said cache memory; and wherein upon receipt of said signals from said main memory at a retrieval of each of said plurality of words, said first circuit means generates signals indicative of a load of a word of information from said main memory to said cache memory, said second circuit means responsive to a free cycle in said signals.

6. In a computer system having a CPU, a main memory, a cache memory, and a cache controller connecting said main memory to said CPU and to said cache memory, said cache controller comprising a first circuit block connected to said CPU, said first circuit block receiving signals from said CPU indicative of a first word requested by said CPU and generating signals to said CPU indicative of the availability of said first requested word to load into said CPU;

a second circuit block connected to said cache memory and to said first circuit block, said second circuit block receiving signals from said cache memory indicative of whether said first requested word is in said cache memory and generating signals to control operations in said cache memory, said second circuit block generating signals to said first circuit block indicative of whether said first requested word is in said cache memory;

a third circuit block connected to said first circuit block, to said main memory and to said second circuit block, said third circuit block receiving signals from said first circuit block for retrieving said first requested word not anywhere within said cache memory, said third circuit block generating signals to said main memory to serially retrieve a line of information including said first requested word from said main memory and generating signals to the second circuit block to load said first requested word into said cache memory on a second data bus, and receiving signals from said main memory indicative of a retrieval of each word in said line of information from said main memory, said third circuit block further generating signals to said first and second blocks indicative of a free cycle in said serial retrieval of said line of information so that upon request by said CPU for a second word, said second requested word anywhere within said cache memory, said first circuit block generates a signal to said CPU indicative of the availability of a second requested word and said second circuit block generates signals to control operations in said cache memory for making said second requested word available to load into said CPU.

7. The cache controller of claim 6 wherein said third circuit block generates signals in a clock cycle to said first and second blocks indicative of a retrieval of each word from said main memory in said retrieval of said line of information.

8. The cache controller of claim 6 wherein said free cycle is indicated by an absence in a clock cycle of said signals to said first and second blocks indicative of a retrieval of each word from said main memory in said retrieval of said line of information.

9. The cache controller of claim 6 further comprising a matching circuit comparing an address of a word of information being requested by said CPU and an address of a word of information being retrieved from said main memory to load into said cache memory, said matching circuit generating a signal to said first circuit block when said addresses match, said first circuit block generating a signal indicative of the availability of said requested word in said cache memory or in said retrieval of said requested word from said main memory for loading into said CPU.

10. In a computer system having a CPU, a cache memory connected to said CPU, a main memory, and a cache controller connecting said main memory to said CPU and said cache memory, a method of operating said cache controller comprising receiving a request from said CPU for a first word of information;

determining that said first word is unavailable in said cache memory;

refilling said cache memory serially from said main memory through the cache controller with a line of information, said line including said first word;

receiving a request from said CPU for a second word of information during said refilling step;

determining a free cycle in said refilling step;

using said free cycle to determining that said second word is available anywhere within said cache memory;

supplying said second word to said CPU during said free cycle;

resuming said refilling step;

whereby said second requested word is received by said CPU prior to completion of said refilling step of said first requested word; and generating a control signal for said CPU when a third word of information requested by said CPU, not in said cache memory, in said line of information, is loaded from said main memory to said cache memory whereby said third word is received by said CPU prior to completion of said transfer of said line of information.

11. A computer system comprising:

a CPU;

a cache memory connected to said CPU;

a main memory; and a cache controller unit coupled to said CPU, the cache controller unit coupled to said main memory by a first data bus and to said cache memory with a second data bus, said cache controller unit having circuit means for generating first control signals for transferring a line of information from said main memory to the cache controller through the first data bus and from the cache controller to said cache memory through the second data bus when a first word of information is requested by said CPU, said cache controller unit also having circuit means generating second control signals for said CPU is found anywhere within said cache memory, whereby said second word of information is received by said CPU prior to completion of said transfer of said line of information;

wherein said cache controller unit circuit means comprises:

a first state machine, said first state machine generating said first control signals;

a second state machine, said second state machine generating said second control signals; and a multiplexer circuit whereby said first control signals are provided to said CPU when a word of said line of information is being transferred from said main memory to said cache memory and said second control signals are provided to said CPU when said second word is being transferred to said CPU.

* * * * *